United States Patent [19]
Wallard

[11] 3,831,508
[45] Aug. 27, 1974

[54] EGG BOILER OR COOKER

[76] Inventor: John J. Wallard, P.O. Box 1053, Scottsdale, Ariz. 85252

[22] Filed: May 25, 1972

[21] Appl. No.: 256,892

[52] U.S. Cl.............. 99/440, 99/382, 220/41, 220/64
[51] Int. Cl.............................................. A47j 43/18
[58] Field of Search............. 99/440, 340, 382, 442; 220/4 B, 4 E, 41, 64; 229/71, 72

[56] References Cited
UNITED STATES PATENTS

| | | | |
|---|---|---|---|
| 451,166 | 4/1891 | Bryant | 99/440 |
| 1,632,115 | 6/1927 | Burrichter | 99/382 |
| 3,161,156 | 12/1964 | Batista et al. | 99/440 UX |
| 3,395,849 | 8/1968 | Gillam | 220/41 X |
| 3,495,735 | 2/1970 | Ulam et al. | 220/64 |
| 3,612,036 | 10/1971 | Kaufman | 220/64 X |
| 3,620,403 | 11/1971 | Rump | 220/4 E |
| 3,721,364 | 3/1973 | Lukaschewitz et al. | 220/41 |

Primary Examiner—Harvey C. Hornsby
Assistant Examiner—Arthur O. Henderson
Attorney, Agent, or Firm—Warren F. B. Lindsley

[57] ABSTRACT

An egg boiler or cooker within which a shelled egg can be cooked so that the egg is hard boiled and conformed to a predetermined shape in a rack for use in a toaster, oven or in boiling water.

3 Claims, 12 Drawing Figures

PATENTED AUG 27 1974

EGG BOILER OR COOKER

BACKGROUND OF THE INVENTION

This invention relates to egg boilers or cookers and is particularly directed to a device for use in toasters, ovens or in boiling water in which a shelled egg is placed to be cooked until it is hard boiled, at which time it conforms to the configuration of a mold in the device.

DESCRIPTION OF THE PRIOR ART

Heretofore egg boilers and cookers have been provided, some including devices comprising cup-like cooperating body sections, the top section having valve means and cutting arms for loosening and releasing the cooked egg from the bottom section of the device. These devices eliminated the need for cooking the egg in its shell and provided the advantage of providing a cup from which the egg can be eaten directly, if desired. The prior art devices, however, were complicated, costly to make and could not be used in a toaster, sandwich grill or any other similar heating appliance.

SUMMARY OF THE INVENTION

The present invention is directed to boiling eggs, and more particularly to a device for cooking the shelled eggs in which a predetermined shape can be inserted in a pop-up or open toaster, oven or in boiling water for cooking purposes and with little or no effort.

It is, therefore, one object of this invention to provide a new and improved device for use in cooking hard boiled eggs in toasters, ovens or boiling water. Another object of this invention is to provide an improved sealable envelope for receiving one or more eggs for hard boiling by a baking process.

A further object of this invention is to provide an improved, flat, sealable, rectangular packet for receiving internally one or more shell-less eggs for cooking in an open-faced or pop-up toaster.

A still further object of this invention is to provide an improved method and structure for forming hard boiled eggs in predetermined configurations for use on salads or in other food decorative efforts.

A still further object of this invention is to provide a device for receiving one or more shelled raw eggs which will support the egg properly for obtaining predetermined hard boiled egg configurations regardless of the position of the device during the cooking process.

A still further object of this invention is to provide a simple, rigid envelope configuration which is inexpensive to manufacture, efficient in use and easily cleaned and serviced.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawings, in which.

DESCRIPTION OF THE PREFERRED EMBODIMENT

Figure 1:
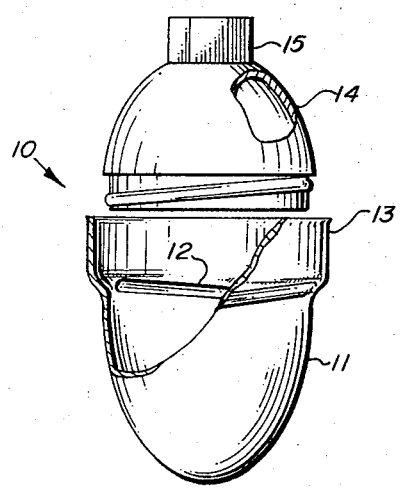
FIG. 1 is an exploded view partly in section of an egg receiving and cooking means.
Figure 2:
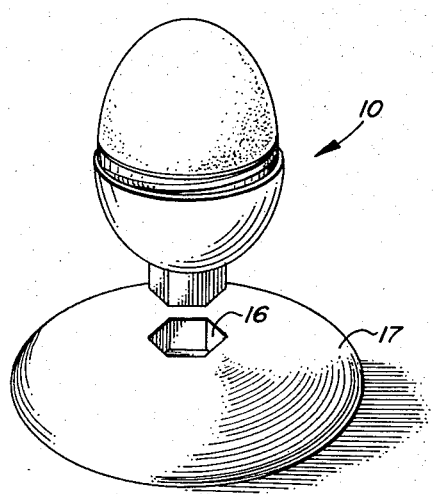
FIG. 2 is an exploded view partly in section of the top portion of the egg receiving and cooking means shown in FIG. 1 together with a stand for holding said means.
Figure 3:
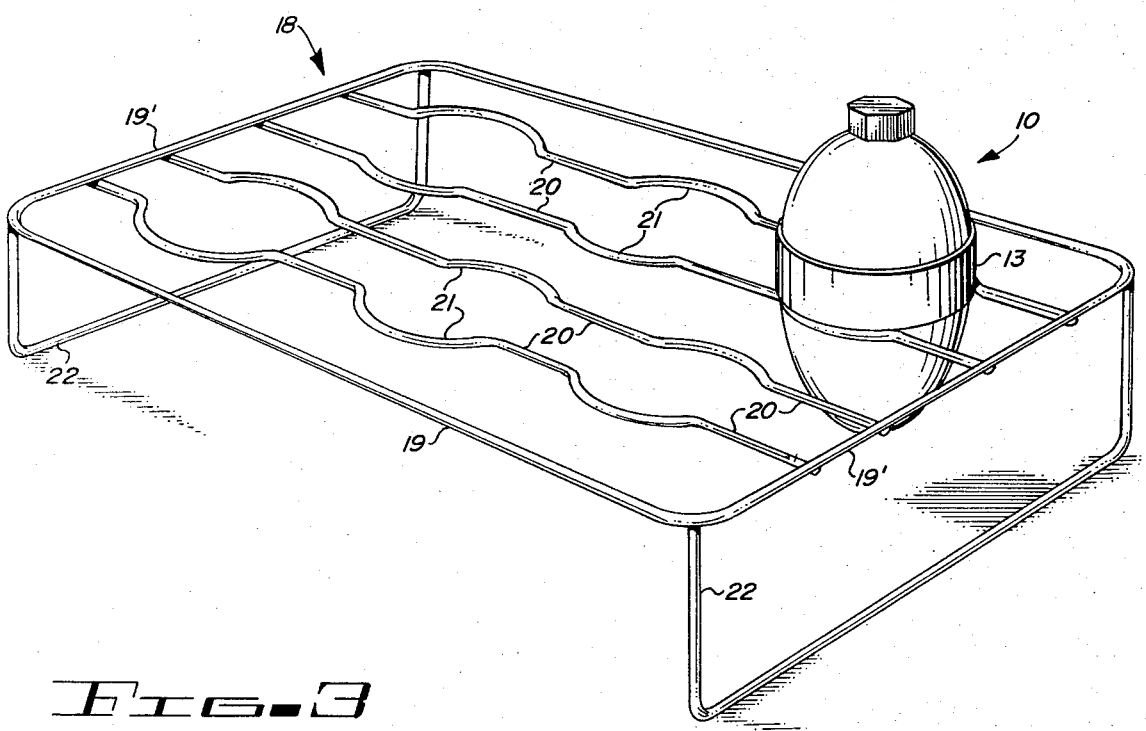
FIG. 3 is a perspective view of a rack for receiving and supporting the egg receiving and cooking means shown in FIG. 1.

Referring more particularly to the drawings by characters of reference, FIGS. 1, 2 and 3 disclose an egg receiving and cooking device 10 which includes a lower rounded conical portion 11 to conform substantially to the shape of a half of an egg. Formed on and rising from the conical portion 11 in a manner to provide an annular interiorly arranged abutment shoulder 12 is a relatively wide annular flange 13 formed on and depending from the lower portion 11.

The top or cover section includes a substantially dome-like upper portion 14 which cooperates with the lower portion 11 by threadedly engaging therewith or interconnecting therewith by other suitable means to form an enclosed device having a shape like the shape of an egg cooked in its shell. The opening in device 10 for receiving the egg must be slightly larger than the egg to allow for expansion of the cooking egg.

The top of the upper portion 14 is provided with a hexagonal surface 15 which may be used in threadedly connecting the upper and lower portions together but also forms a surface for engaging a hexagonal opening 16 in a base member 17 shown in FIG. 2 for supporting the upper portion 14 in inverted position, thereby serving as a cup from which the egg may be eaten.

It should be understood that the hexagonal surface 15 and opening 16 in base member 17 may be of any other suitable configuration and that the egg cooked may be hard boiled or cooked to any other degree.

The surface 15 forms a reduced section of the upper portion 14, thereby providing a handle to facilitate the application and removal of the cover formed by upper portion 14 with respect to the lower portion 11.

In order to support one or more devices 10 within a cooking vessel such as an oven or pan (not shown) a rack 18 is provided as shown in FIG. 3 which is preferably formed from wire to provide an outer rectangular enclosure 19. Secured between the ends 19' of the enclosure 19 is a plurality of holders, each including a pair of strands of wire having parallel portions 20 and outwardly rounded portions 21 for cooperating with each other for receiving, holding and supporting one or more devices 10 in upright positions, as shown. Each device 10 is provided with a collar-like structure between its ends for engaging the rounded portions 21 of rack 18 for holding device 10 in a given place in rack 18 formed by flange 13.

Formed on and depending from the rectangular enclosure 19 are legs 22 for use in positioning the rack in an oven or pan.

The interior of the upper and lower portions 11 and 14 may be lined with the commercial product called Teflon or the whole device 10 formed of that product, if so desired.

From the above description and the disclosure in the drawing, it is believed that the use of the device and the rack for supporting a number of the devices will be obvious, but it might be mentioned that when it is desired to cook an egg it is broken in the botton portion and the upper or cover portion is applied thereto, as shown in FIG. 1, thence the device is disposed within one of the holders of the rack, and the latter is placed within an oven or in a pan of water. When the egg is cooked, the cover is removed and the upper portion provides a cup from which the egg can be eaten. The upper portion is removed from the rack, preferably after the latter has been removed from the oven or pan. Thus it will be seen that my device and rack materially overcome all of the difficulties now present in boiling, handling and removing cooked eggs from their shells. It is thought from the foregoing description that the advantages and novel features of this part of the invention will be readily apparent.

Figure 4:
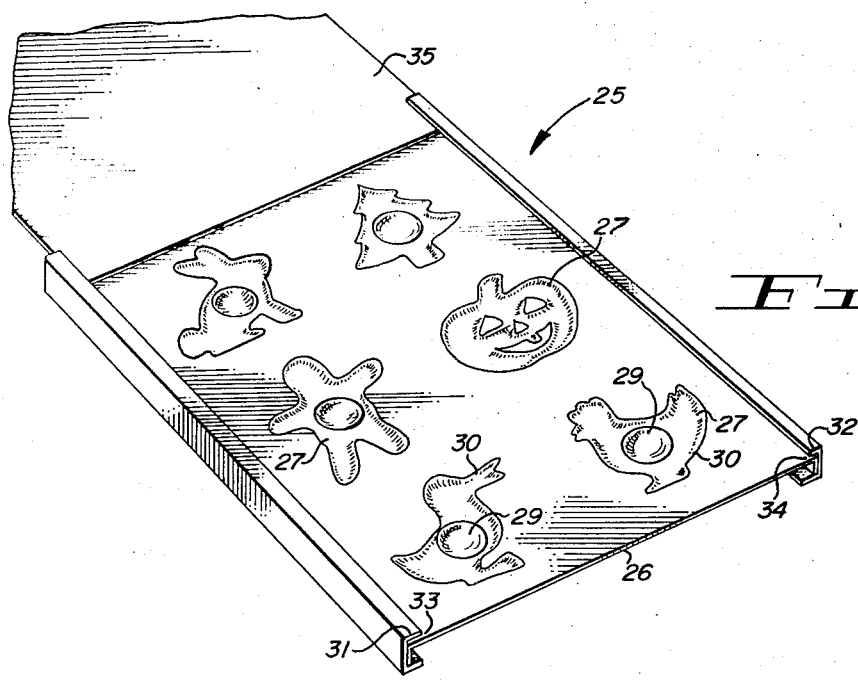
FIG. 4 is a modification of the egg receiving and cooking means shown in FIG. 1 with its cover pulled back showing the mold cavities.

FIG. 4 discloses a modification of the egg boiling and cooking device 10 shown in FIGS. 1–3 wherein a device 25 of envelope-like configuration is shown for receiving shelled eggs comprising a rack or pan 26 having indentations 27 stamped therein of one or more different configurations for each receiving a different raw egg. Each configuration may have a center portion 29 for receiving the yoke of the egg with the peripheral portion 30 of the indentation tapering outwardly from the center portion. This feature compensates for eggs of various sizes.

The rack or pan 26 is provided with turned-over sides 31,32 arranged for providing slots 33,34 along the sides of the pan for receiving in siding air-tight arrangement the flat cover 35. The pan and cover may be coated with Teflon or made completely therefrom to avoid sticking of the egg to these parts, as well known in the art.

Device 25 then may be placed in a pan or oven or toaster for cooking the eggs to a boiled state. As recognized from the indentations 27 in pan 26 the boiled egg may have many different configurations, thereby aiding the user in decorating food servings or encouraging children to eat the boiled eggs.

FIGS. 5–8 disclose a new and useful way of boiling eggs by a baking process through the use of an envelope 40 for insertion in a cooking appliance such as a pop-up toaster 41. The envelope 40 comprises a rack or pan 42 having an indentation 43 of any suitable configuration for receiving a raw egg formed therein, which pan in then inserted in or covered by a cover-like member 44 in an air-tight arrangement.

Figure 6:
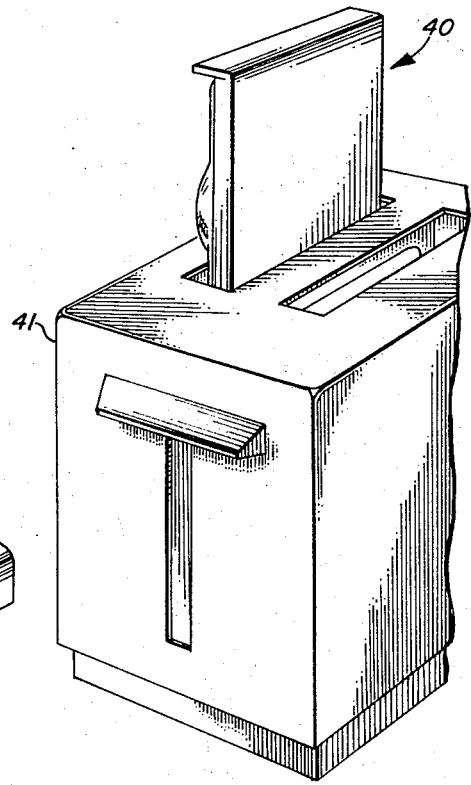
FIG. 6 is a partial view of a pop-up toaster showing the egg receiving and cooking means of FIG. 5 being inserted in the toaster.
Figure 7:
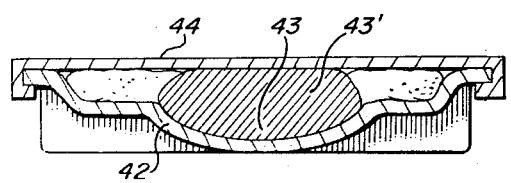
FIG. 7 is a cross-sectional view of FIG. 6 taken along the line 7—7.
Figure 8:
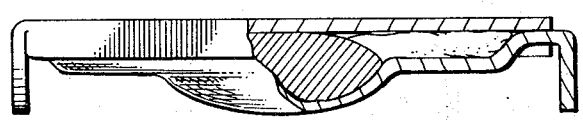
FIG. 8 is a side view of FIG. 5, partially broken away, showing the cover in place.

When the raw egg 43' is placed in indentation 43 of pan 42 it is inserted in cover-like member 44 and the envelope 40 comprising the pan and cover-like member is then inserted in an oven, pan of water or toaster of a suitable type, for example, the pop-up toaster 41 shown in FIG. 6, where it is cooked to a hard boiled state.

Figure 5:
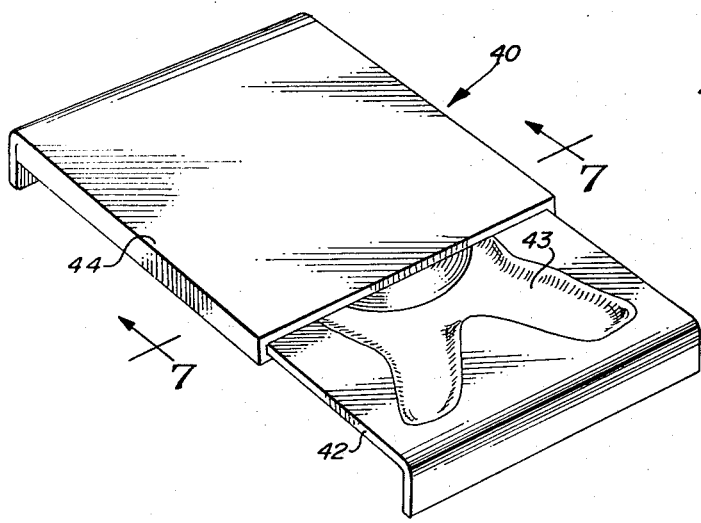
FIG. 5 is a further modification of the egg receiving and cooking means shown in FIGS. 1 and 4.
Figure 9:
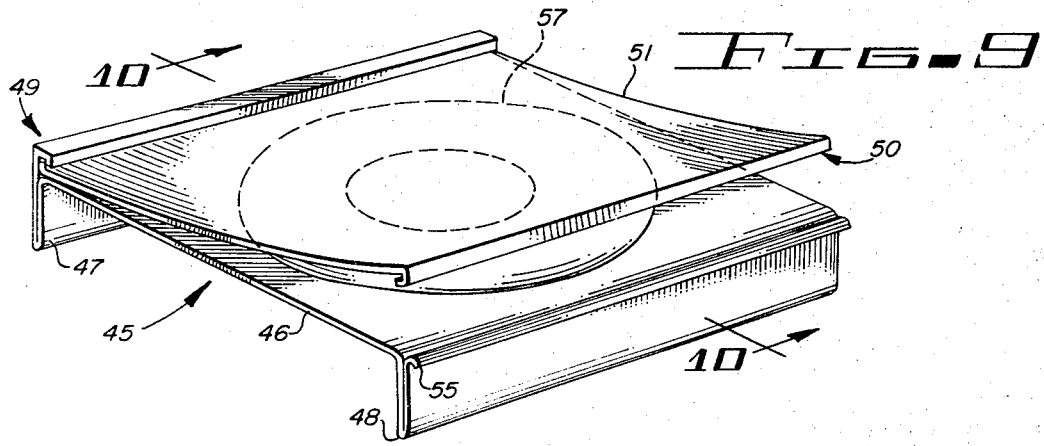
FIG. 9 is a modification of the envelope shown in FIG. 5.
Figure 10:
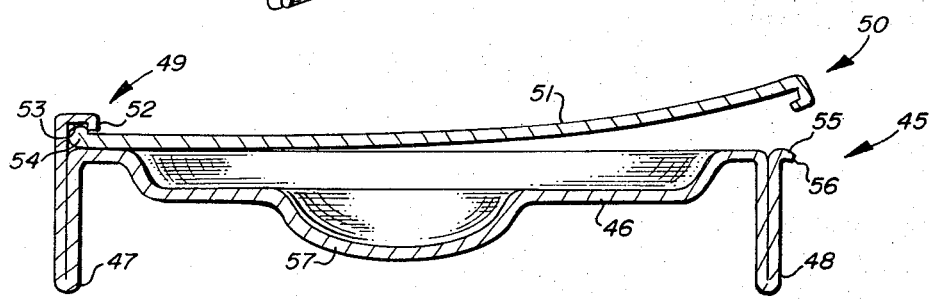
FIG. 10 is a cross-sectional view of FIG. 9 taken along the line 9—9.

FIGS. 9 and 10 illustrate a further modification of the envelope shown in FIG. 5 wherein envelope 45 comprises a rack or pan 46 having a pair of legs 47 and 48 extending from the bottom of pan 46 which are turned back on themselves, as shown, to provide a hinge member 49 and catch 50 for a cover 51.

Leg 47 is provided with a turned-over end 52 which forms an opening 53 for receiving a rounded end 54 of cover 51. The cover is provided with an arcuate, deformable surface that when bent against its normal bias may be distorted to cause its turned-over end 55 of leg 48 to engage a lip 56 on the end of leg 48. Thus, cover 51 detachably engages with its rounded end 54 in opening 53 of the turned-over end of leg 47 and then may be fastened in air-tight engagement with pan 46 by means of its catch 50, as readily seen from the drawing.

The circular configuration 57 in pan 46 receives a raw egg to be boiled by cooking in an oven, pan of water or any suitable open face or pop-up toaster as shown in FIG. 6.

The configuration may be of any size and the inside surfaces of pan 46 and cover 51 may be covered by Teflon or the whole envelope may be made of Teflon or other suitable material.

Figure 11:
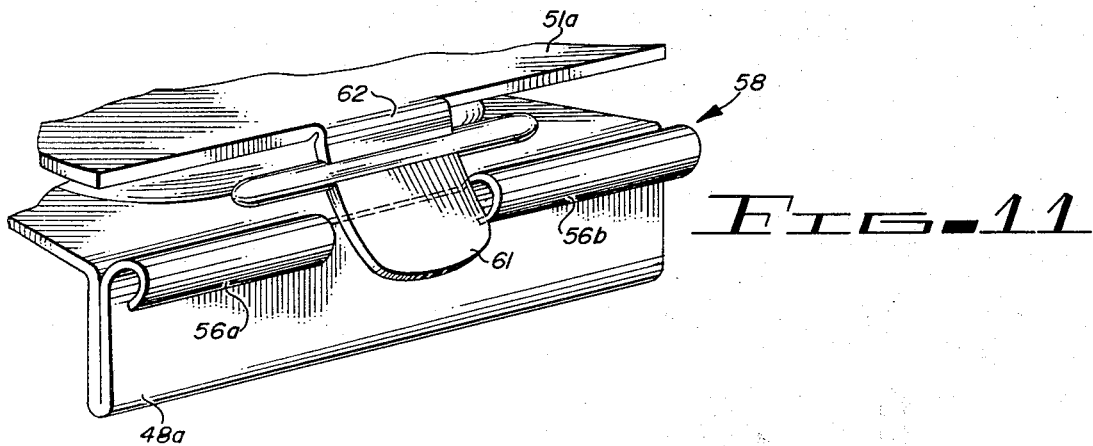
FIG. 11 is a partial view showing a modification of the cover attachment means shown in FIGS. 9 and 10.
Figure 12:
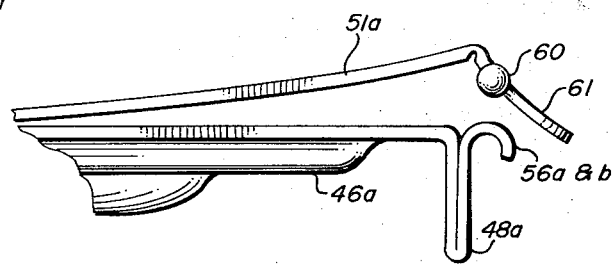
FIG. 12 is a partial end view of the structure shown in FIG. 11.

FIGS. 11 and 12 illustrate a further modification of catch 50, which catch 60 may be applied to an envelope 58 having an arcuately deformed cover 51a of the type shown in FIGS. 9 and 10. The turned-over leg 48a is provided with spaced arcuate-shaped lip portions 56a and 56b which are arranged for engaging a split cylindrical catch member 60 which is arranged to receive through its slip a tab 61 extending from the edge 62 of cover 51a. When cover 51a is closed in air-tight arrangement against pan 46a, the cylindrical catch member 60 is drawn over and around the spaced arcuate-shaped lip portions 56a and 56b until the cylindrical catch member 60 is received therewithin, thereby holding the cover tightly against the pan 46a.

The eggs in all of the modifications disclosed can be cooked to any degree of hardness, depending on the length of time it remains in the cooking apparatus.

Still further, the cooking devices disclosed may be readily used for cooking other food products equally well, such as, for example, pancake batter, mashed potatoes and the like, thereby giving versatility and a range of uses, particularly to the devices shown in FIGS. 4–12.

Although but a few embodiments of the present invention have been illustrated and described, it will be apparent to those skilled in the art that various changes and modifications may be made therein without departing from the spirit of the invention or from the scope of the appended claims.

What is claimed is:

1. A cooking device comprising:
a first member having a flat surface,
said surface being provided with at least one indentation for receiving a pliable food product and forming it into a predetermined configuration when cooked, a cover member for cooperatively engaging with said flat surface for tightly engaging said surface, said cooking device when containing the pliable food product in the indentation between said first member and said cover member in substantially air-tight arrangement being ready for placement in a heating medium for cooking, said first member and said cover member when in cooperating engagement forming a substantially rectangular envelope, said first member and said cover member each providing at a first common end of said envelope a part of a hinge member for detachably connecting said cover member to said first member and at a second common end each providing a part of a catch member for detachably fastening said cover member to said first member, said cover member being provided with a concave configuration normally biasing the second common end of said cover member away from the second common end of said first member, said catch member when locking said cover member to said first member being biased against the normal bias of said cover member.

2. The egg cooking device set forth in claim 1 wherein:

said surface and said cover member cooperatively engaging said surface are covered with Teflon.

3. The cooking device set forth in claim 1 wherein:

the indentation in said flat surface comprises a circular configuration.

* * * * *